: US 6,314,224 B1

(12) United States Patent
Stevens et al.

(10) Patent No.: US 6,314,224 B1
(45) Date of Patent: Nov. 6, 2001

(54) THICK-WALLED CABLE JACKET WITH NON-CIRCULAR CAVITY CROSS SECTION

(75) Inventors: John Boyet Stevens, Statesville; Peter Elisson, Hickory; Jeffrey S. Barker, Statesville; Eric Buckland, Hickory, all of NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/335,911

(22) Filed: Jun. 18, 1999

(51) Int. Cl.[7] .................................................. G02B 6/44
(52) U.S. Cl. ............................................................ 385/113
(58) Field of Search ...................................... 385/113, 112, 385/101, 114; 350/96.23, 96 B; 174/70 R, 23 C; 117/117 F; 244/3.12

(56) References Cited

U.S. PATENT DOCUMENTS

| | | | |
|---|---|---|---|
| 4,038,489 | 7/1977 | Stenson et al. | 174/70 R |
| 4,166,670 | 9/1979 | Ramsay | 350/96.23 |
| 4,199,225 | 4/1980 | Slaughter et al. | 350/96.23 |
| 4,312,566 | 1/1982 | Jackson | 350/96.23 |
| 4,420,220 | 12/1983 | Dean et al. | 350/96.23 |
| 4,741,594 | 5/1988 | Suzuki | 350/96.23 |
| 5,067,831 | 11/1991 | Robbins et al. | 385/123 |
| 5,155,304 | 10/1992 | Gossett et al. | 174/117 |
| 5,222,180 | 6/1993 | Kuder et al. | 385/115 |
| 5,333,229 | 7/1994 | Sayegh | 385/102 |
| 5,402,966 | 4/1995 | Van Hoessle | 244/3.12 |
| 5,448,670 | 9/1995 | Blew et al. | 385/112 |
| 5,509,097 | 4/1996 | Tondi-Resta et al. | 385/113 |
| 5,651,081 | 7/1997 | Blew et al. | 385/101 |
| 5,675,686 | 10/1997 | Rosenmayer et al. | 385/114 |

FOREIGN PATENT DOCUMENTS

| | | | |
|---|---|---|---|
| 676 654 | 10/1995 | (EP) . | |
| 2 555 764 | 5/1985 | (FR) . | |
| 1422147 | 1/1976 | (GB) | G02B/5/16 |
| 1480206 | 7/1977 | (GB) | G02B/5/14 |

OTHER PUBLICATIONS

Patent Abstracts of Japan, vol. 15, No. 144 (P–1189) (Apr. 1991) as it relates to JP 03–020704 (Jan. 1991).
J. Boyet Stevens et al., "Finite Element Modeling of Optic Fiber Cable Crush Performance", Alcatel OFCCC. English Abstract of Japanese Patent Application No. 919893; Nov. 1998.

Primary Examiner—Phan T. H. Palmer
Assistant Examiner—Michael P. Mooney
(74) Attorney, Agent, or Firm—Sughrue, Mion, Zinn, Macpeak & Seas, PLLC

(57) ABSTRACT

An optical fiber cable including a cable jacket having a longitudinally extending inner cavity with a non-circular cross section, and at least two longitudinally extending strength members, wherein the non-circular cross section is disposed so that a minor axis thereof is substantially aligned with a line joining the at least two longitudinally extending strength members.

17 Claims, 6 Drawing Sheets

THICK-WALLED CABLE JACKET WITH NON-CIRCULAR CAVITY CROSS SECTION

BACKGROUND OF THE INVENTION

1. Field of the Invention

This invention relates to optical fiber cables having cable jackets with non-circular cavity cross sections for improved crush resistance.

2. Background Art

The background art shows cable jackets having non-circular cross-sectional shapes for both the outer periphery and cavity thereof. Moreover, the background art associates improved crush resistance with such non-circular shapes.

A paper by Stevens et al., entitled "FINITE ELEMENT MODELING OF OPTIC FIBER CABLE CRUSH PERFORMANCE" (IWCS, November 1998), provides an analysis of elastic-plastic deformations of thermoplastic cable elements using finite element modeling. This paper is incorporated herein by reference. The cable elements considered in the above paper included non-circular cross sections. The authors concluded that by changing the shape from a circular to an elliptical or rectangular cross-section, the cable can have improved crush resistance, lower weight and better unidirectional flexibility.

Blew et al. (U.S. Pat. No. 5,651,081) disclose an optical fiber cable having a non-circular outer periphery and a circular cavity. See, e.g., FIG. 4 of Blew et al.

Cables having a non-circular outer periphery exhibit greatly improved crush performance but may pose cable closure compatibility problems, product marketing and/or customer perception problems as compared to cables having a conventional circular outer periphery.

Dean et al. (U.S. Pat. No. 4,420,220) disclose an optical fiber cable having a circular outer periphery and a non-circular cavity. See, e.g., FIG. 3 of Dean et al. However, in Dean et al., the non-circular cavity is oriented such that its major axis coincides with a line extending between the strength members. Consequently, this fiber cable exhibits relatively poor crush resistance in a direction transverse to the line extending between the strength members.

SUMMARY OF THE INVENTION

It is an object of the invention to maximize the crush resistance of a fiber optic cable by providing a cavity with a non-circular cross section.

The above object is accomplished by providing an optical fiber cable in which the non-circular cross section cavity has a minor axis that is substantially aligned with a line extending between the strength members. The inner cavity may have many different types of non-circular shapes.

If a non-circular outer periphery of the cable does not pose any problems such as described above, then that feature could be combined with the non-circular cavity having the orientation described above, and the non-circular outer periphery should also have a predetermined orientation to compliment the orientation of the non-circular cavity.

DETAILED DESCRIPTION OF THE PREFERRED EMBODIMENTS

Figure 1:
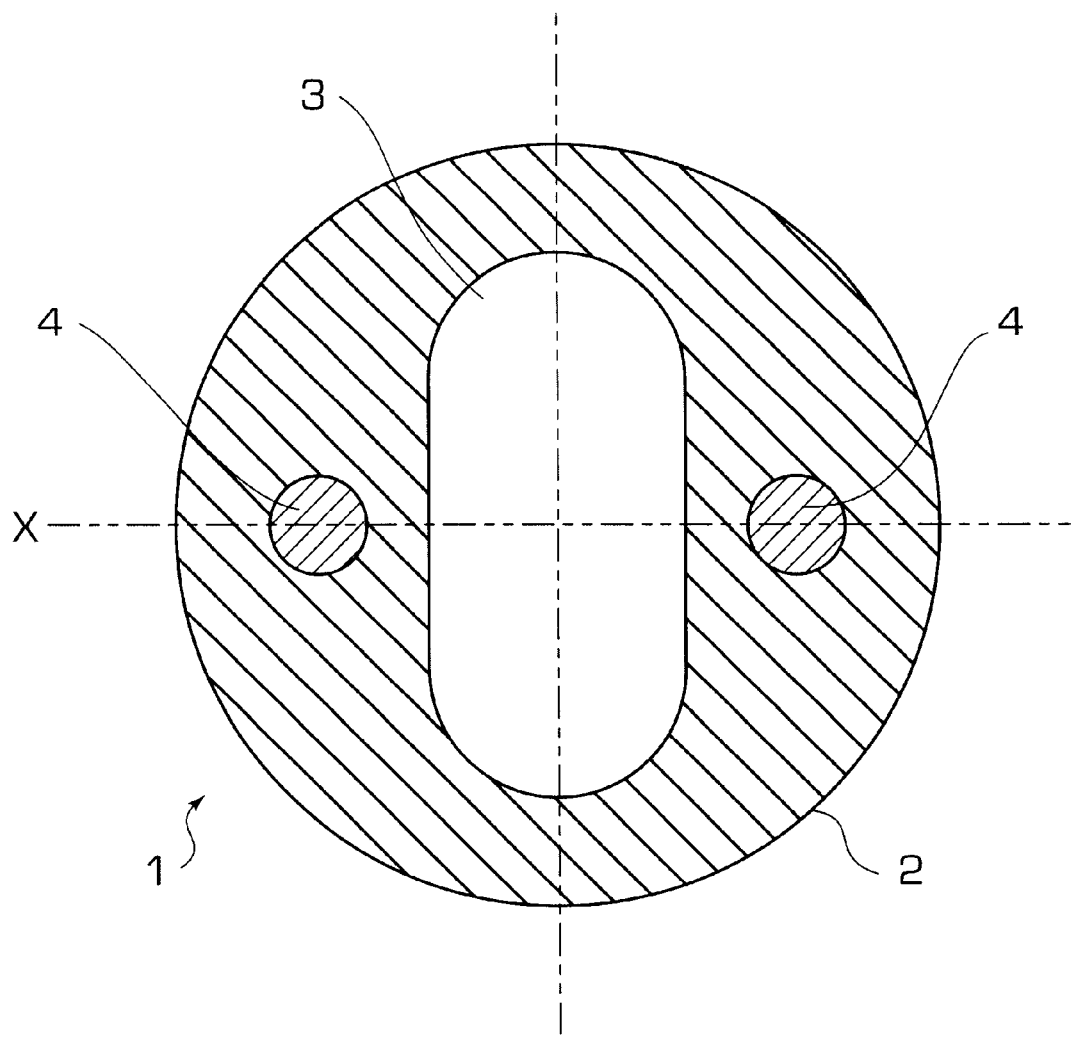
FIG. 1 shows an optical fiber cable according to a first embodiment of the invention.

A first embodiment of the present invention is shown in FIG. 1. As shown in this figure, the fiber optic cable 1 has a circular outer periphery 2 and a non-circular cavity 3. One or more optical fibers (not shown) are inserted in the cavity 3. Strength members 4, 4 extend longitudinally within the cable 1 in the same direction as the cavity 3. A minor axis X of the cavity 3 in cross-section is substantially aligned with a line connecting the strength members 4, 4.

The cable has a lower crush resistance in a direction parallel to the minor axis of the cavity, and therefore the minor axis is aligned with a line joining the strength members.

It should be noted that the minor axis does not have to exactly coincide with or be exactly parallel to the line joining the strength members, i.e., there can be an offset in either direction and/or an angle therebetween. The term "substantially aligned" is intended to encompass such an offset and/or angle. The same is true with respect to the major axis and a line perpendicular to the line joining the strength members. In other words, the added crush resistance offered by using an elongated cavity with the major axis perpendicular to the plane containing the strength members will not be affected significantly by vertical, horizontal and/or angular offsets of the cavity with respect to the plane containing the strength members and/or the plane perpendicular thereto. In general, the amount of translational offset in any direction is preferably equal to or less than half the dimension of the minor axis of the cavity. Angular offsets are preferably equal to or less than 15 degrees. However, the invention is not intended to be limited to these preferred ranges.

The cable of the present invention has improved crush resistance in a plane normal to a plane containing the strength members and also affords an additional thermal window for the contained optical fibers to buckle during thermal cycling. The non-circular cavity, however, reduces crush resistance in the direction along the minor axis of the cavity. The strengthening members are intended to compensate at least somewhat for this reduced crush resistance.

The non-circular cavity imposes a preferential crush resistance rather than a balanced crush resistance. A circular exterior with a non-circular cavity oriented such that the major axis coincides with the crush loading direction will endure higher crush loads than the same size circular section unit with a circular cavity whose diameter is the same as the minor axis of the elliptical cavity.

If an application requires a more balanced and higher crush resistance, rectangular or other polygonal shaped cavities should be used. The polygonal cavity is preferably, though not necessarily, oriented such that a vertical side lies along the crush load direction at the lateral extremities of the cavity.

The cavity 3 in FIG. 1 has straight vertical sides and rounded or curved ends, i.e., it has a "race-track" shape. It is desirable to make the radius of curvature of the ends of the cavity as large as possible, and therefore the ends are preferably semicircular.

Numerous different materials might be used to form the cable jacket, strength members and filling compound. For example, the cable jacket might be made of polyethylene (high, medium or low density), halogen free flame retardant material, polypropylene, polyvinylchloride (PVC), and/or polyamide (PA). The strength member might be made of glass fiber reinforced plastic, steel, and/or aramid reinforced plastic. The filling compound might be a silicon based water blocking gel or polyolefin based gel. Of course, the above materials are only examples, and the present invention is not intended to be limited to these materials.

Figure 2:
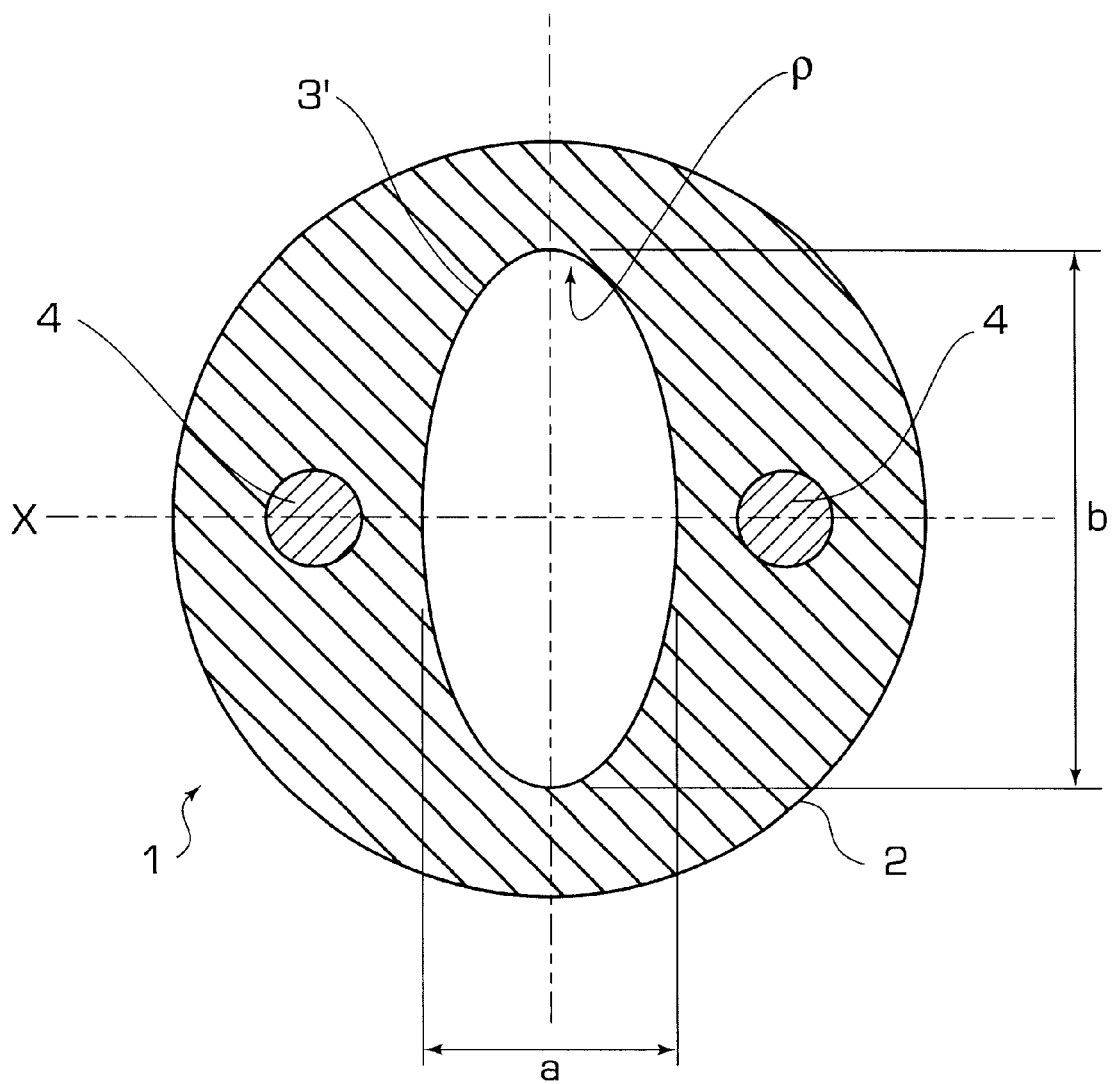
FIG. 2 shows an optical fiber cable with an elliptical cavity according to a second embodiment.
Figure 3:
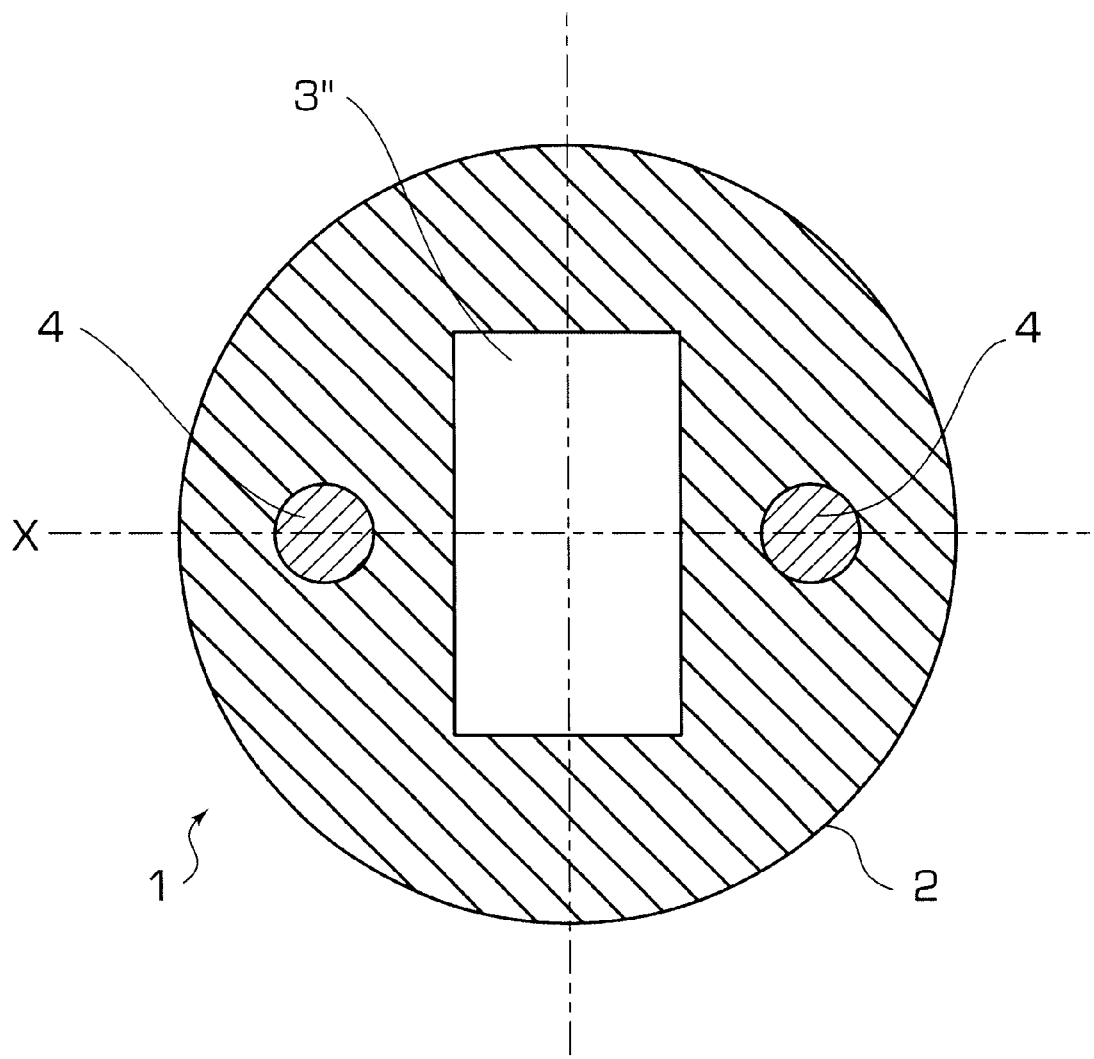
FIG. 3 shows an optical fiber cable with a rectangular cavity according to a third embodiment.
Figure 4:
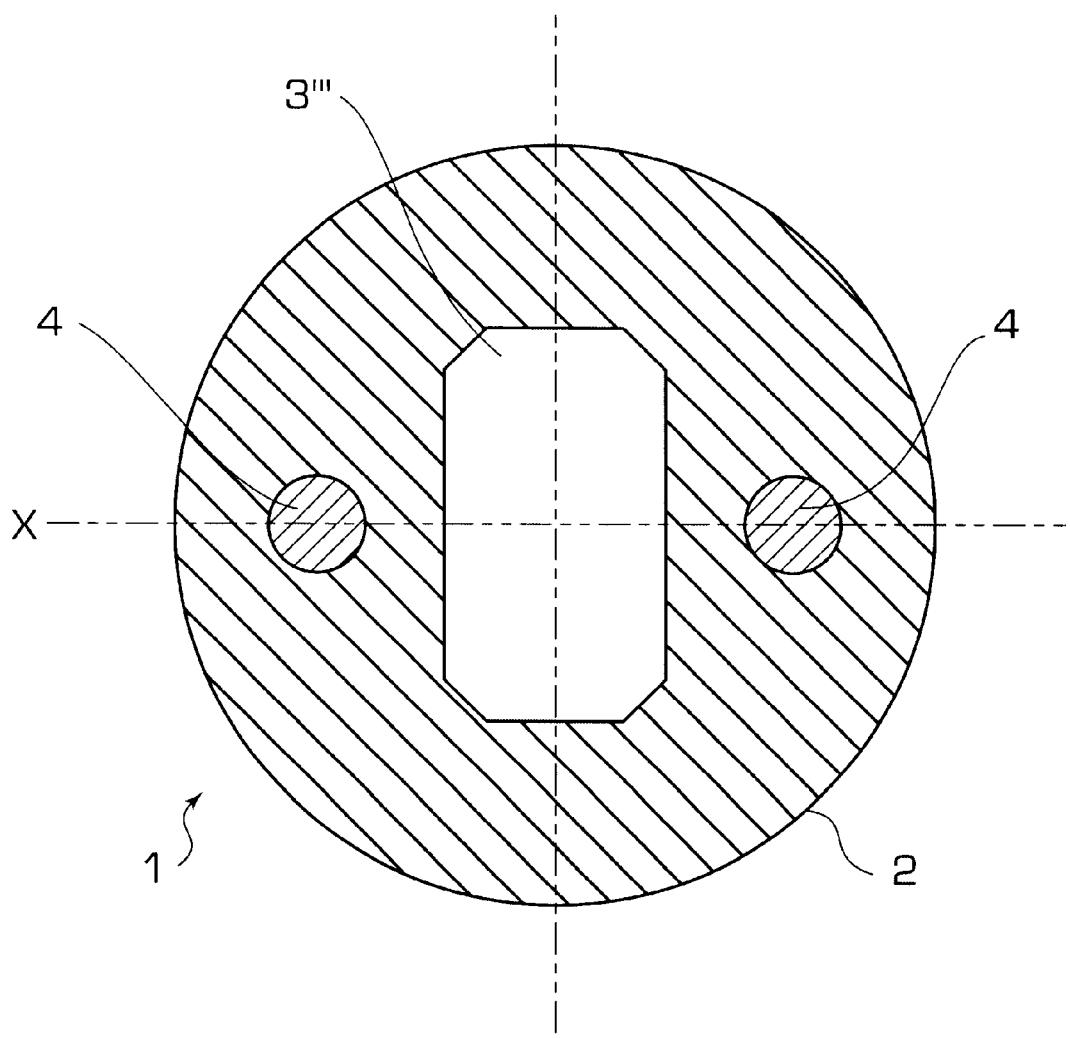
FIG. 4 shows an optical fiber cable with a polygonal cavity according to a fourth embodiment.

As noted above, the cavity can have different shapes, as shown in the other referred embodiments in FIGS. 2–4, provided that the minor axis is substantially aligned with the line connecting the strength members. The same reference numbers in FIGS. 1–4 are used to designate the same elements.

As shown in FIG. 2, the cavity 3' has an elliptical shape. In the case of an elliptical shaped cavity with a circular shaped exterior, additional mechanisms act to improve the crush performance in the direction along the major axis of the ellipse. The first mechanism has to do with the curvature of the lateral extremity of the cavity. The elliptical cavity will have a smaller radius of curvature than a circular one causing a lower stress concentration, slower evolution of plastic strain and a subsequently higher collapse load. The second has to do with the buckling stability of the cavity and also depends on this curvature. The elliptical cavity is less curved at the lateral extremity and therefore has a higher local buckling stability. These two mechanisms are coupled and act together to effectively cause more rapid conformation of the top and bottom surface of the cable unit with the flat loading plates and subsequent favorable load redistribution.

As shown in FIG. 3, the cavity 3" has a rectangular shape. As a modification to this embodiment, the sharp corners of the rectangular shaped cavity can be rounded (not shown in the drawing figures), i.e., they can be made to have a radius of curvature.

As shown in FIG. 4, the cavity 3''' has a polygonal shape.

The variation in cavity shape can be continuously characterized by three geometric parameters; the aspect ratio a/b where a is the cavity width and b is the cavity height, and the conic factor $\rho$ which characterizes the nature of the roundness of the corners of the cavity. See FIG. 2, for example. The conic factor is used to characterize the nature of the curvature of the corners in the elliptical cavities and rectangular shaped cavities with rounded corners. If the value of conic factor is 0.414, then the corners will be rounded with a circular shaped corner. If the value is greater than 0.414, then the corners will become sharper and the shape will be more like a rectangle with sharp corners. If the value is less than 0.414, the corners are smoothed into an elliptical shape.

In the case of a polygonal cavity (e.g., see FIG. 4), the geometry can be characterized by the number of sides of the polygon (N), the aspect ratio of the polygon, and the radius of the vertices if rounded.

Figure 5:
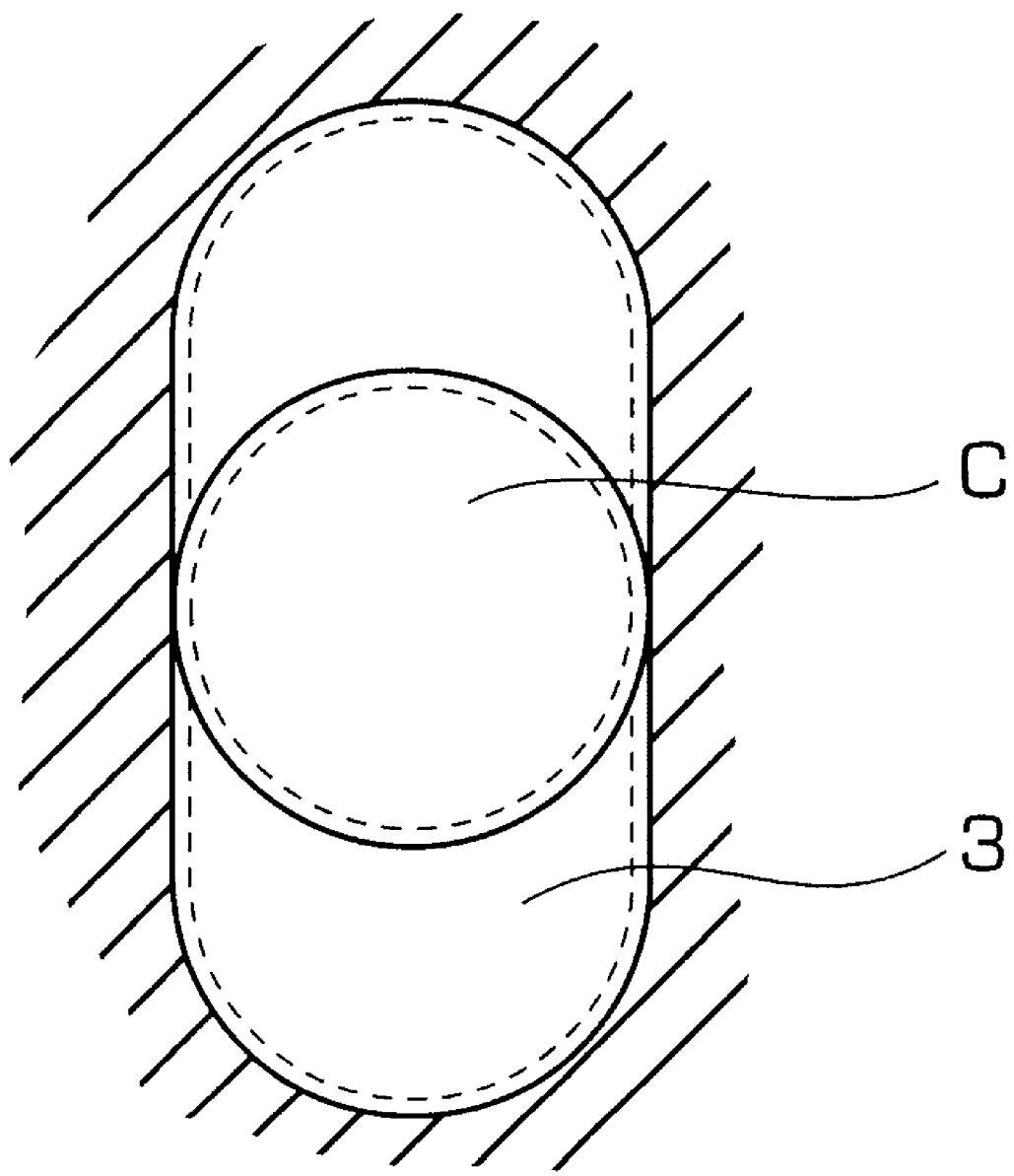
FIG. 5 is a cross-sectional view of an optical fiber cable showing increased fiber excess length capacity.

FIG. 5 is a cross-sectional view of an optical fiber cable showing increased fiber excess length capacity for an elongated cavity 3 (same as FIG. 1) as compared to a circular cavity C. The dashes show the path of the optical fibers within the cavities. In addition to improved crush resistance, a cable cross-section with a circular perimeter and non-circular cavity (e.g., race-track, rectangular or polygonal shaped cavity) with an aspect ratio (a/b) less than 1 will also provide more excess length capacity. The excess length of fiber in a circular cavity is assumed to be generated via the fiber (or fiber bundle) buckling from a straight axial path coinciding with the cable axis, into a helical path whose axis coincides with the cable axis and that has a helical radius equal to the radius of the circular cavity. With an elongated cavity 3 having a minor axis equal to the diameter of the aforementioned circular cavity C, the fiber will buckle into an elongated helix allowing for more excess length of fiber. With more excess length of fiber for the same cable outer diameter, the strength member size can be reduced due to less stiffness requirement for the cable. With a smaller strength member, less plastic will be required to sufficiently encapsulate the strength member and will yield a lower coefficient of thermal expansion which in turn allows for more excess fiber length in the cable while maintaining cold temperature performance.

Figure 6:
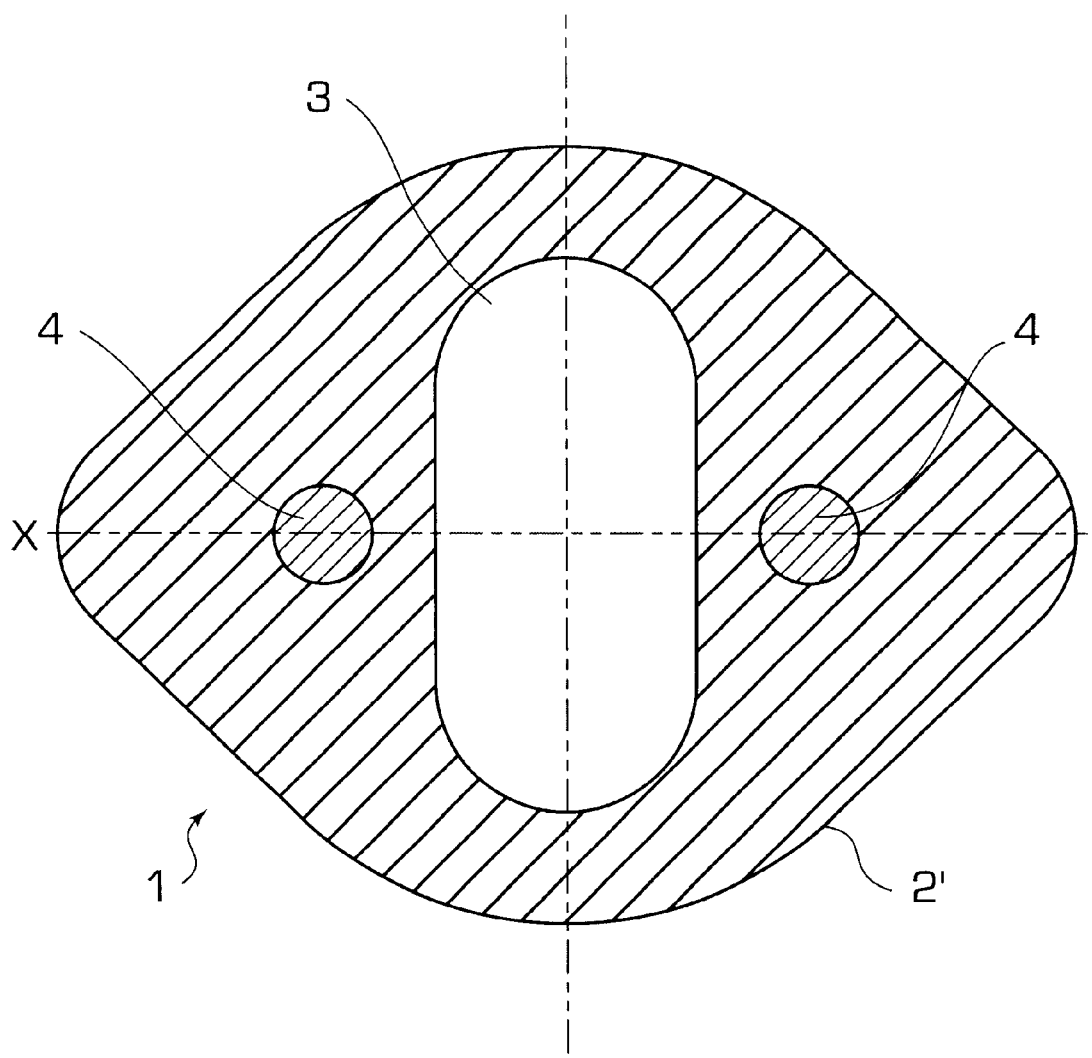
FIG. 6 shows an optical fiber with a non-circular cavity and exterior according to a fifth embodiment.

Finally, if a non-circular outer shape of the cable is acceptable, then the cables described above can be modified to include such a feature. For example, see the cable 1 shown in FIG. 6. The crush resistance of the cable with the non-circular cavity is improved in the direction perpendicular to the plane of the strength members, but is somewhat reduced in the direction parallel to the plane. If the exterior shape of the cable (see outer periphery 2' in FIG. 6, for example) is such that its major axis is parallel to the plane containing the strength members and with the minor axis of the cavity also being aligned with the plane containing the strength members, the crush resistance is improved in all directions. This is particularly effective in the case of a cable having an elliptical exterior shape, since when such a cable is loaded along its major axis it has a tendency to flip by 90 degrees so that the line of action of the load coincides with its minor axis. However, the cavity has its major axis aligned with this direction of the load, thereby maintaining the crush resistance of the cable.

Different cavity shapes are shown and described herein. However, this invention is not intended to be limited to these shapes, as these shapes are only examples.

Also, as noted above, the invention is not intended to be limited to cavities in which the minor and/or major axes exactly coincide with or are parallel to the line joining the strength members, i.e., there can be an offset in either direction and/or an angle therebetween.

We claim:

1. An optical fiber cable comprising:
   a cable jacket having an inner peripheral surface which defines a single, longitudinally extending, centrally located inner cavity with a non-circular cross section; and
   at least two longitudinally extending strength members embedded in the cable jacket on opposite sides of the inner cavity,
   wherein the non-circular cross section is disposed so that a minor axis thereof is substantially aligned with a line joining said at least two longitudinally extending strength members.

2. The optical fiber cable recited in claim 1, wherein the minor axis is parallel with the line joining said at least two longitudinally extending strength members.

3. The optical fiber recited in claim 1, wherein the minor axis is coincident with the line joining said at least two longitudidally extending strength members.

4. The optical fiber recited in claim 1, wherein an offset of the minor axis from the line joining said strength members is equal or less than one-half the dimension of the minor axis of the cavity.

5. The optical fiber recited in claim 1, wherein an angular offset between the minor axis and the line joining said strength member is equal or less than 15 degrees.

6. The optical fiber cable recited in claim 1, wherein the non-circular cross section has a shape that is in the form of a rectangle with a semi-circle disposed at each longitudinal end thereof.

7. The optical fiber cable recited in claim 1, wherein a major axis of the non-circular shape is substantially perpendicular to the line joining said at least two strength members.

8. The optical fiber cable recited in claim 1, wherein the cavity has a polygonal shape.

9. The optical fiber cable recited in claim 1, wherein the cavity is rectangular.

10. The optical fiber cable recited in claim 1, wherein an outer periphery of said cable jacket has a circular cross section.

11. The optical fiber cable recited in claim 1, wherein an outer periphery of said cable jacket has a non-circular cross section.

12. The optical fiber cable recited in claim 11, wherein a major axis of the non-circular cross section of the outer periphery of said cable jacket is substantially aligned with the line joining said at least two longitudinally extending strength members.

13. An optical fiber cable comprising:
at least two longitudinally extending strength members; and
a cable jacket having an outer periphery with a circular cross section and an inner peripheral surface which defines a longitudinally extending inner cavity with a non-circular cross section, the non-circular cross section having a shape that is in the form of a rectangle with a semi-circle disposed at each longitudinal end thereof,
wherein, at any given station along said fiber optic cable, the non-circular cross section is arranged such that a minor axis thereof coincides with a line joining center points of said at least two longitudinally extending strength members at that given station.

14. An optical fiber cable comprising:
a cable jacket having a longitudinally extending inner cavity with a non-circular cross section; and
at least two longitudinally extending strength members in the cable jacket,
wherein the non-circular cross section is disposed so that a minor axis thereof is substantially aligned with a line joining said at least two longitudinally extending strength members,
wherein an outer periphery of said cable jacket has a non-circular cross section, and
wherein a major axis of the non-circular cross section of the outer periphery of said cable jacket is substantially aligned with the line joining said at least two longitudinally extending strength members.

15. An optical fiber cable comprising:
a cable jacket having an inner peripheral surface which defines a longitudinally extending inner cavity with a non-circular cross section; and
at least two longitudinally extending strength members in the cable jacket,
wherein the non-circular cross section is disposed so that a minor axis thereof is substantially aligned with a line joining said at least two longitudinally extending strength members,
wherein the non-circular cross section has a shape that is in the form of a rectangle with a semi-circle disposed at each longitudinal end thereof.

16. An optical fiber cable comprising:
a cable jacket having an inner peripheral surface which defines a longitudinally extending inner cavity with a non-circular cross section; and
at least two longitudinally extending strength members in the cable jacket,
wherein the non-circular cross section is disposed so that a minor axis thereof is substantially aligned with a line joining said at least two longitudinally extending strength members, and
wherein the cavity is rectangular.

17. An optical fiber cable comprising:
a cable jacket having an inner peripheral surface which defines a longitudinally extending inner cavity with a non-circular cross section; and
at least two longitudinally extending strength members in the cable jacket,
wherein the non-circular cross section is disposed so that a minor axis thereof is substantially aligned with a line joining said at least two longitudinally extending strength members, and
wherein an outer periphery of said cable jacket has a non-circular cross section.

* * * * *